US012715812B2

(12) United States Patent
Zhou et al.

(10) Patent No.: US 12,715,812 B2
(45) Date of Patent: Aug. 25, 2026

(54) POLYMER HAVING DISPERSING FUNCTION, OIL WELL CEMENT DISPERSANT, AND PREPARATION METHOD THEREFOR AND USE THEREOF

(71) Applicants: CHINA PETROLEUM & CHEMICAL CORPORATION, Beijing (CN); SINOPEC PETROLEUM ENGINEERING TECHNOLOGY RESEARCH INSTITUTE CO., LTD, Beijing (CN)

(72) Inventors: Shiming Zhou, Beijing (CN); Xia Miao, Beijing (CN); Guangguo Yang, Beijing (CN); Haoguang Wei, Beijing (CN); Peiqing Lu, Beijing (CN); Jingnan Xiao, Beijing (CN); Hongqi Yang, Beijing (CN); Rengguang Liu, Beijing (CN); Lei Chen, Beijing (CN); Lishuang Wang, Beijing (CN); Laiyu Sang, Beijing (CN); Jinkai Zhang, Beijing (CN); Yongtao Chu, Beijing (CN)

(73) Assignees: CHINA PETROLEUM & CHEMICAL CORPORATION, Beijing (CN); SINOPEC PETROLEUM ENGINEERING TECHNOLOGY RESEARCH INSTITUTE CO., LTD, Beijing (CN)

( * ) Notice: Subject to any disclaimer, the term of this patent is extended or adjusted under 35 U.S.C. 154(b) by 854 days.

(21) Appl. No.: 18/041,600

(22) PCT Filed: Aug. 12, 2021

(86) PCT No.: PCT/CN2021/112593

§ 371 (c)(1),
(2) Date: Feb. 14, 2023

(87) PCT Pub. No.: WO2022/033588

PCT Pub. Date: Feb. 17, 2022

(65) Prior Publication Data

US 2023/0286862 A1 Sep. 14, 2023

(30) Foreign Application Priority Data

Aug. 14, 2020 (CN) ......................... 202010820725.0

(51) Int. Cl.

| | |
|---|---|
| ***C04B 24/42*** | (2006.01) |
| *C04B 103/00* | (2006.01) |
| *C04B 103/40* | (2006.01) |

(52) U.S. Cl.

CPC ...... *C04B 24/42* (2013.01); *C04B 2103/0046* (2013.01); *C04B 2103/408* (2013.01)

(58) Field of Classification Search

CPC ..................................................... C04B 24/42

See application file for complete search history.

(56) References Cited

U.S. PATENT DOCUMENTS

2002/0055559 A1 5/2002 Kistenmacher et al.

FOREIGN PATENT DOCUMENTS

| | | | |
|---|---|---|---|
| CN | 101792281 | A | 8/2010 |
| CN | 104558434 | A | 4/2015 |
| CN | 104592457 | A | 5/2015 |
| CN | 105754045 | A | 7/2016 |
| CN | 105837763 | A | 8/2016 |
| CN | 106496442 | A | 3/2017 |
| CN | 106496445 | A | 3/2017 |
| CN | 107540795 | A | 1/2018 |
| CN | 108102043 | A | 6/2018 |
| CN | 108250370 | A | 7/2018 |
| CN | 108840587 | A | 11/2018 |
| CN | 108976355 | A | 12/2018 |
| CN | 109749019 | A | 5/2019 |
| CN | 109970931 | A | 7/2019 |
| CN | 110790528 | A | 2/2020 |
| EP | 0940374 | A1 | 9/1999 |
| JP | 2000072505 | A | 3/2000 |
| JP | 2001507054 | A | 5/2001 |
| JP | 2018111627 | A | 7/2018 |

OTHER PUBLICATIONS

English language translation JP 2000-72505; Mar. 2000.*

Bai, Jingjing; "Design, Synthesis of Viscosity-reducing Polycarboxylate Superplasticizer and Its Influence on Cement-Silica Fume Paste with Low Water-binder Ratio", Materials Review, vol. 34, No. 3, Apr. 9, 2020; ISSN:1005-023X; pp. 1-88.

Bai, Jingjing et al.; "Synthesis of organosilane-modified polycarboxylate superplasticizer and their interaction with cement-silica fume paste with low water-binder ratio", Hunan University, Master Thesis, Sep. 21, 2019.

* cited by examiner

*Primary Examiner* — Margaret G Moore
(74) *Attorney, Agent, or Firm* — NKL Law; Allen Xue

(57) ABSTRACT

A polymer having a dispersing function, a preparation method therefor, and a use thereof as a cement dispersant are provided. The polymer has a structural unit a, a structural unit b, a structural unit c and a structural unit d. The structural unit a is provided by an unsaturated polyether and/or polyester, the structural unit b is provided by an unsaturated carboxylic acid or an anhydride or salt thereof, the structural unit c is provided by a silane and/or siloxane containing a polymerizable group, and the structural unit d is provided by an unsaturated sulfonic acid or a salt thereof. The molar ratio of the structural unit a to the structural unit d is 1:(5-15) and the polymer has a weight average molecular weight of 20,000 to 120,000. The polymer can be used as an oil well cement dispersant.

18 Claims, 1 Drawing Sheet

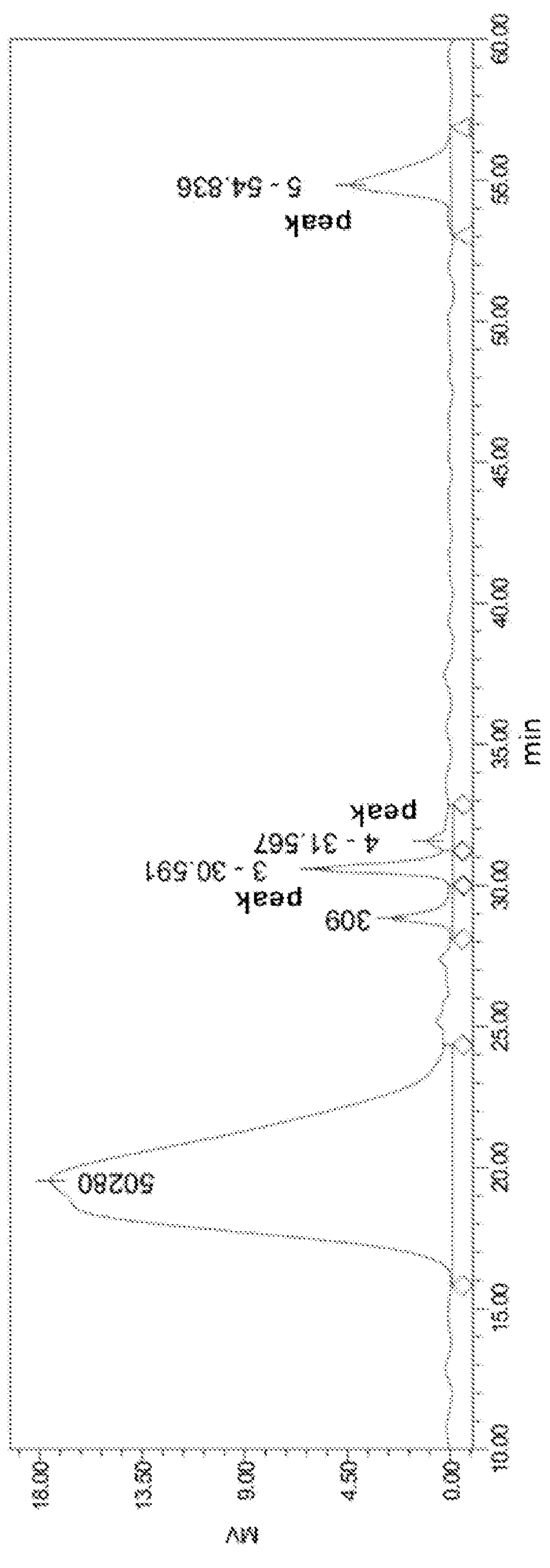
peak
5 - 54.836
peak
4 - 31.567
3 - 30.591
peak
309
50280
min
MV
10.00
15.00
20.00
25.00
30.00
35.00
40.00
45.00
50.00
55.00
60.00
0.00
4.50
9.00
13.50
18.00

POLYMER HAVING DISPERSING FUNCTION, OIL WELL CEMENT DISPERSANT, AND PREPARATION METHOD THEREFOR AND USE THEREOF

CROSS REFERENCE TO RELATED APPLICARTIONS

The application is a U.S. national stage entry of PCT International Application No. PCT/CN2021/112593, filed on Aug. 13, 2021, which claims priority to the Chinese Patent Application No. 202010820725.0, filed on Aug. 14, 2020 and entitled "POLYMER HAVING DISPERSING FUNCTION, OIL WELL CEMENT DISPERSANT, AND PREPARATION METHOD THEREFOR AND USE THEREOF", the content of which is entirely incorporated herein by reference.

TECHNICAL FIELD

The invention relates to a polymer suitable for oil well cement and an oil well cement dispersant, and a preparation method and a use thereof.

BACKGROUND OF THE INVENTION

Well cementation is an essential part of the oil exploration and development, and it requires pumping a cement slurry into the annulus between the casing pipes and the wellbore. The addition of various admixtures to cement slurry to adjust the comprehensive properties of cement slurry is a key technique for the well cementation, such that the type of oil well cement can meet the requirements of the endlessly emerging conditions of well cementation and the high quality of well cementation.

Conventional cement additives include filtrate reducers, thickening time control agents (set retarders, coagulation accelerators), dispersants, weight reducers, weighting agents, etc. Filtrate reducers serve to reduce the water loss of cement slurries and prevent dehydration of the cement slurries. The set retarders and coagulation accelerators are used to adjust the thickening time of the cement slurries, and some coagulation accelerators can further increase the early strength of the set cement. The addition of said additives tends to cause that the slurry has a reduced fluidity and the pumping operation is difficult. Therefore, the addition of dispersing agents are needed to improve the fluidity of cement slurries.

The sulfonated ketoaldehyde condensation polymer dispersants have been successfully developed in the early 1990's as dispersant products, and currently are among the most widely used dispersants in oil well cements in China and foreign countries. The kind of dispersants has the advantages such as a wide variety of raw materials, being reasonably priced, having better temperature resistance than naphthalene based products and being suitable for many types of oil well cements. However, along with the deepening of oil well exploration and development as well as increasingly stringent requirements of environmental protection, the shortcomings of the sulfonated ketoaldehyde condensation polymer dispersants have been exposed: 1) the toxicity and pollution of raw materials cause the pollution, serious toxicity and side-effect in the production and application process; 2) low dispersive power and high dosage; 3) insufficient dispersive power for complex systems which are added with silica fume, latex and the like, and 4) poor compatibility with other novel additives.

The conventional dispersants used in the construction industry are polycarboxylic acid type dispersants. Generally, the polycarboxylic acid type dispersants are produced by free radical polymerization of the unsaturated acid type monomers (e.g., acrylic acid, maleic acid, itaconic acid) and polyether macro-monomers (e.g., methylallyl polyoxyethylene/polyoxypropylen ether, isoamyl alcohol polyoxyethylene ehter), and have a comb-like molecular structure. The dispersants can be used in various cement slurry systems by changing the acid ether ratio, side chain length and density, so as to produce a desirable dispersion effect. However, researches show that the polycarboxylic acid dispersants used in construction industry lack temperature resistance, and are prone to decompose above 70° C. degrees, which causes the cement slurry have a delayed coagulation or even super-retarded coagulation. Therefore, the direct use of the polycarboxylic acid type dispersants in the oil well cement cannot meet the requirements of well cementing. The carboxylic acid groups in the molecular structure of the polycarboxylic acid type dispersants can be adsorbed on the surface of cement particles, and they can produce the dispersion effect by the electrostatic repulsion. Therefore, generally speaking, the higher is the acid/ether ratio in the molecular structure (i.e., the higher is the carboxylic acid content), the stronger is the adsorption property and the better is the dispersion effect, but the higher acid/ether ratio will greatly inhibit cement hydration, especially in the medium- and low-temperature well cementing projects at 30-120° C., wherein the dispersants exhibit the defects such as long thickening time, low early strength, and even causing a long-setting or ultra-long setting accidents. Furthermore, when the conventional polycarboxylic acid dispersants are used together with the filtrate reducer, set retarder and other commonly used additive in the oil well cement, there are problems such as poor dispersion effect and unsatisfactory compatibility.

SUMMARY OF THE INVENTION

The construction process of the well cementation projects has the characteristics of a plurality of admixtures and additives, it imposes a much stringent requirements on the oil well cement dispersants than the building cement, the three key requirements are as follows: 1. Efficient dispersion property. The desired dispersion effect is required for special cement slurry systems other than the conventional cement slurries, such as high density cement slurries, low density cement slurries, latex cement slurries, fluid silicone slurries, etc.; 2. Without delaying cement hydration and without affecting early strength, that is, the delayed coagulation is a side effect for the oil well cement dispersants. The delayed coagulation increases the risk of gas channeling during the coagulation process of cement slurry, affects the solidification of the cement sheath during the low temperature stage, increases the time of waiting on cement setting, extends the time period of construction, or even causes engineering accidents with ultra-long setting; the addition of coagulation accelerators or early strength agents into the polycarboxylate dispersants in order to overcome the delayed coagulation is generally ineffective due to the strong adsorption of polycarboxylate, and the addition brings about the engineering risks; 3. Compatibility with various additives, polycarboxylate at present has ubiquitous defect of poor compatibility with other oil well cement additives, especially the poor compatibility with the new-type polymer-based set retarders, filtrate reducers, there is an urgent need to solve the problems such as damage of the filtrate reducer, or dispersant failure.

In regard to the problems and technical difficulties of the oil well cement dispersants, the inventors of the present invention have discovered that by introducing a large amount of sulfonic acid to replace a portion of carboxylic acid, causing the sulfonic acid to perform a major adsorption function, the problem of delayed coagulation caused by the carboxylic acid groups are eliminated and the thickening time is effectively shortened, while ensuring the effective dispersion properties caused by steric hindrance of the comb-shaped structure of the polymer; in addition, the introduction of a long-chain silane into the polymer can produce the favorable effects in two aspects. On the one hand, the dispersant produces a chemical anchoring function by the water shrinkage action of the silane groups on the surface of the cement particles and hydration products, thereby enhancing the adsorption function of the dispersant with the surface of the cement-based material particles, avoid the failure of the dispersant due to competitive adsorption caused by the charge-adsorbing groups such as carboxylic acid, sulfonic acid of the additives, when the conventional polycarboxylic acid dispersant is used in combination with other additives (e.g., a set retarder, a filtrate reducer), such that the compatibility of the dispersant with the other additives is enhanced. On the other hand, the hydrophobicity of the long-chain groups can destroy the thick hydration film formed on the surface of the cement particles along the comb-finger structure of polyether chain segments of the dispersant, thereby breaking the delayed coagulation properties caused by the hydration film, and produce the effect of reducing the delayed coagulation properties. In addition, an use of the sulfonic acid having a benzene ring under a preferred embodiment, the hydrophobicity of the benzene ring and the hydrophobicity of the long-chain silane can produce a synergistic effect, the dispersant can form hydrophobic patches along the thick hydration film formed along the comb-finger direction of the comb-shaped polymer when the dispersant adsorbs on the surface of the cement particles, the hydrophobic patches may disrupt the structural integrity of the hydration film from the inside, and are conducive to breaking the hydration film, thereby further reducing the delayed coagulation properties caused by the thick hydration film and increasing the early strength of the cement. Therefore, unlike the conventional dispersants, the dispersant in the invention not only has the efficient dispersion property of the polycarboxylic acid comb-shaped dispersants, but also overcomes the side effects of the delayed coagulation of the dispersants from the operation mechanism level, which is extremely important in the well cementing projects. The dispersant of the present invention can guarantee the rheological properties of the cement slurry and ensure the timely solidification, thereby facilitating the prevention of leakages and channeling, securing the safety of construction and saving of work hours, such that the present invention has been completed. The polymer and cement dispersant provided by the invention have advantages such as excellent dispersion effect, short thickening time, and high early strength, thus are especially suitable for application in the medium- and low-temperature well cementing projects at a temperature range of 30-120° C.

In a first aspect, the present invention provides a polymer having a dispersing function, the polymer comprises a structural unit a, a structural unit b, a structural unit c and a structural unit d;

wherein the structural unit a is provided by an unsaturated polyether and/or polyester, the structural unit b is provided by an unsaturated carboxylic acid or an anhydride or salt thereof, the structural unit c is provided by a silane and/or siloxane containing a polymerizable group, and the structural unit d is provided by an unsaturated sulfonic acid or a salt thereof; the molar ratio of the structural unit a to the structural unit d is 1:(5-15), preferably 1:(6-10), the polymer has a weight average molecular weight of 20,000-120,000.

According to some embodiments of the invention, the molar ratio of the structural unit a:the structural unit b:the structural unit c is 1:(0.5-6):(0.01-4), preferably 1:(1-4):(0.05-2), more preferably 1:(1-4):(0.1-1).

According to some embodiments of the invention, the molar ratio of the structural unit b to the structural unit d is 1:(2-8).

According to some embodiments of the invention, the unsaturated polyester has a structure represented by formula (I):

(I)

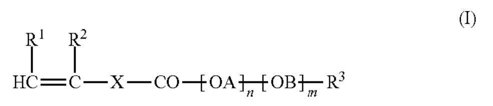

in formula (I),

A denotes an alkylene having 2-4 carbon atoms;

B denotes an alkylene having 2-4 carbon atoms and different from A;

$R^1$ and $R^2$ each independently represents H or an alkyl having 1-5 carbon atoms, preferably methyl;

$R^3$ denotes an alkyl having 1-4 carbon atoms;

X denotes an alkylene having 1-5 carbon atoms;

m represents an integer from 0 to 200, preferably 20 to 140;

n represents an integer from 0 to 200, preferably 20 to 140;

m+n>10, preferably m+n≥40;

the unsaturated polyether has a structure represented by formula (II):

formula (II)

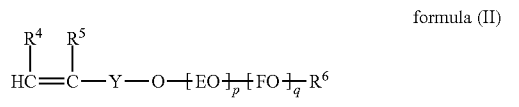

in formula (II),

E denotes an alkylene having 2-4 carbon atoms;

F denotes an alkylene having 2-4 carbon atoms and different from E;

$R^4$ and $R^5$ each independently represents H or an alkyl having 1-5 carbon atoms, preferably methyl;

$R^6$ denotes an alkyl having 1-4 carbon atoms;

Y denotes an alkylene having 1-5 carbon atoms;

p represents an integer from 0 to 200, preferably 20 to 140;

q represents an integer from 0 to 200, preferably 20 to 140;

p+q>10, preferably p+q≥40.

In the present invention, the term "unsaturated acid and/or salts thereof and/or anhydrides thereof" refers to one or more selected from the group consisting of the unsaturated acid; the sodium salts, potassium salts and ammonium salts of the unsaturated acid, and the anhydrides of the unsaturated acid.

According to some embodiments of the invention, the unsaturated carboxylic acid has a structure represented by formula (1):

formula (1)

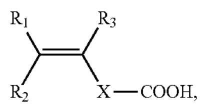

in formula (1), $R_1$, $R_2$ and $R_3$ each is independently selected from hydrogen, C1-C6 alkyl, and —COOH, X is $(CH_2)_n$, and n is 0, 1, 2, 3, 4, 5, or 6.

According to some embodiments of the invention, the unsaturated carboxylic acid and/or an anhydride thereof and/or a salt thereof is one or more selected from the group consisting of acrylic acid, methacrylic acid, itaconic acid, fumaric acid and maleic acid, and the anhydrides or salts thereof.

According to some embodiments of the invention, the unsaturated sulfonic acid and/or salt thereof contains a substituted or unsubstituted benzene ring or amide group, preferably the unsaturated sulfonic acid or salt thereof includes a structure represented by any one of formula (IIIA)-formula (IIID):

formula IIIA

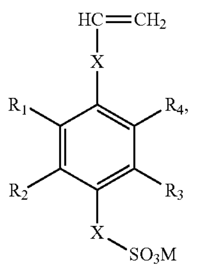

formula IIIB

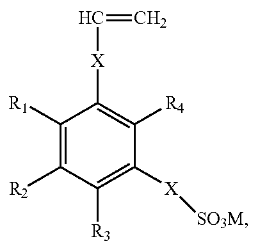

formula IIIC

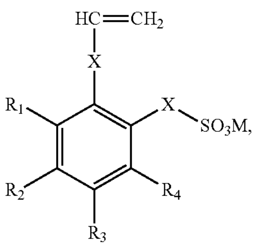

formula IIID

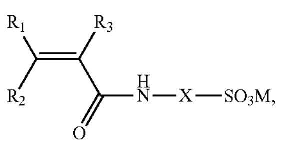

in formula IIIA, formula IIIB and formula IIIC, $R_1$, $R_2$, $R_3$ and $R_4$ are each independently selected from hydrogen, halogen, C1-C6 alkyl and C1-C6 alkoxyl, X is $(CH_2)_n$, n is an integer from 0 to 6, and M is hydrogen or a metal ion, such as an alkali metal ion, preferably lithium ion, sodium ion or potassium ion;

in formula IIID, $R_1$, $R_2$ and $R_3$ are each independently selected from hydrogen and C1-C6 alkyl, X is $(CH_2)_n$, n is an integer from 0 to 6, and M is hydrogen or a metal ion, such as an alkali metal ion, preferably lithium ion, sodium ion or potassium ion.

According to some embodiments of the invention, the unsaturated sulfonic acid or salt thereof is one or more selected from the group consisting of 2-acrylamide-2-methyl propane sulfonic acid, 2-acrylamido-2-methyl propanesulfonate, p-styrene sulfonic acid, p-styrene sulfonate, methyl p-styrene sulfonic acid, methyl p-styrene sulfonate, p-styrene sulfonate, allyl sulfonic acid and allyl sulfonate.

In the present invention, the polymerizable group may be various groups capable of bonding with other monomers under desired conditions, for example, the polymerizable group may be one or more selected from the group consisting of carbon-carbon double bonds, carbon-carbon triple bonds and epoxy groups.

The silane and/or siloxane used in the present invention is preferably a silane and/or siloxane having a number of linear carbon atoms between the silicon atom and the polymerizable group being not less than 5, preferably not less than 7, further preferably from 8 to 25, even further preferably from 8 to 18, where n may be 8, 9, 10, 11, 12, 13, 14, 15, 16, 17, 18, 19, 20, 21, 22, 23, 24 or 25.

According to some embodiments of the invention, the silane and/or siloxane preferably has a structure represented by formula (IV):

(IV)

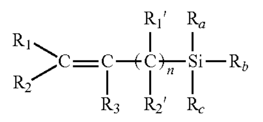

In formula (IV), each of $R_1$, $R_2$, $R_3$, $R_1'$ and $R_2'$ is independently selected from H and C1-C4 alkyl; $R_a$, $R_b$ and $R_c$ are each independently selected from H and C1-C4 alkyl or alkoxyl, and n is an integer from 5 to 25, preferably from 8 to 18.

In the present invention, the number of linear chain carbon atoms between the polymerizable group and the silicon atom refers to the number of carbon atoms of the backbone carbon chain between the polymerizable group and the silicon atom, and n in the aforesaid formula (IV) is exactly the number of linear chain carbon atoms between the polymerizable group and the silicon atom.

In the present invention, the C1-C4 alkyl may be methyl, ethyl, n-propyl, isopropyl, n-butyl, isobutyl and tert-butyl.

In the present invention, the C1-C4 alkoxyl may be methoxyl, ethoxyl, n-propoxy, isopropoxy, n-butoxy, isobutoxy and tert-butoxy.

The silanes and/or siloxanes used in the present invention may be, for example, one or more selected from the group consisting of vinyl octadecyl trimethoxysilane (i.e., n in formula (IV) is 18, and the following compounds are similar), vinyl hexadecyl trimethoxysilane, vinyl tetradecyl trimethoxysilane, vinyl dodecyl trimethoxysilane, vinyl decyl dimethoxysilane, vinyl octyl dimethoxysilane, 7-octenyl trimethoxysilane, vinyl hexyl dimethoxysilane; vinyl octadecyl dimethoxysilane, vinyl hexadecyl dimethoxysilane, vinyl tetradecyl dimethoxysilane, vinyl dodecyl dimethoxysilane, vinyl octadecyl trimethoxysilane, vinyl hexadecyl trimethoxysilane, vinyl tetradecyl trimethoxysilane, vinyl dodecyl trimethoxysilane, vinyl decyl trimethoxysilane, vinyl octyl trimethoxysilane, vinyl hexyl trimethoxysilane; vinyl octadecyl dimethoxysilane, vinyl hexadecyl dimethoxysilane, vinyl tetradecyl dimethoxysilane, vinyl dodecyl dimethoxysilane, vinyl decyl dimethoxysilane, vinyl octyl dimethoxysilane, vinyl hexyl dimethoxysilane; propenyl octadecyl trimethoxysilane, propenyl hexadecyl trimethoxysilane, propenyl tetradecyl trimethoxysilane, propenyl dodecyl trimethoxysilane, propenyl decyl dimethoxysilane, propenyl octyl dimethoxysilane, propenyl hexyl dimethoxysilane; propenyl octadecyl dimethoxysilane, propenyl hexadecyl dimethoxysilane, propenyl tetradecyl dimethoxysilane, propenyl dodecyl dimethoxysilane, propenyl decyl dimethoxysilane, propenyl octyl dimethoxysilane, propenyl hexyl dimethoxysilane; propenyl octadecyl trimethylsilane, propenyl hexadecyl trimethylsilane, propenyl tetradecyl trimethylsilane, propenyl dodecyl trimethylsilane, propenyl decyl trimethylsilane, propenyl octyl trimethylsilane, propenyl hexyl trimethylsilane; propenyl octadecyl dimethylsilane, propenyl hexadecyl dimethylsilane, propenyl tetradecyl dimethylsilane, propenyl dodecyl dimethylsilane, propenyl decyl dimethylsilane, propenyl octyl dimethylsilane and propenyl hexyl dimethylsilane.

In the present invention, the silane and/or siloxane containing a polymerizable group (particularly, a long-chain silane) are commercially available, and can also be prepared with the conventional methods in the art. For example, a long-chain chlorosilane can be obtained by initially reacting a Grignard reagent having the structure represented by formula (IV') with tetrachlorosilane, the obtained long-chain chlorosilane is then subjected to alcoholysis to produce a silane coupling agent of the present invention. The conditions for preparing the silane coupling agent are not particularly limited herein, as long as the requirements of the present invention can be satisfied, (IV')

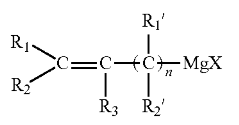

In formula (IV'), the definitions of $R_1$, $R_2$, $R_3$, $R_1'$, $R_2'$, $R_a$, $R_b$, $R_c$ and n are as those defined in formula (IV). Alternatively, a Grignard reagent (which refers to a hydrocarbyl magnesium halide (R—MgX)) is subjected to a coupling reaction with an haloalkane to form hydrocarbons, for example, vinyl heptadecanyl dimethylsilane is produced through the reaction of hexadecyl dimethyl chlorosilane and allyl magnesium chloride, the reaction formula is as follows:

$Cl(CH_2)_{16}SiH(CH_3)_2+H_2C{=}CH—CH_2MgCl \rightarrow H_2C{=}CH—CH_2—(CH_2)_{16}SiH(CH_3)_2+MgCl_2$ The specific reaction conditions are generally known among those skilled in the art, the content will not be repeatedly described herein. Unless otherwise specified, the silane/siloxane in the following examples of the present invention are prepared by using the aforesaid process.

In the present invention, the presence of structural unit a, structural unit b, structural unit c and structural unit d and the molar content thereof can be measured by the infrared spectroscopy in combination with $^1$H-NMR (1 hydrogen-nuclear magnetic resonance).

According to some embodiments of the invention, the polymer has a comb-shaped structure. The comb-shaped structure refers to that the structure formed by polymerization of the carbon-carbon double bonds is a skeleton structure, and the structure of each structural unit coupled with a carbon-carbon double bond forms a sagging structure which resembles a comb finger.

In accordance with some embodiments of the invention, the polymer is a random copolymer. The polymer in the invention may be verified as a random copolymer by confirming that the DSC (Diffferential Scanning calorimeter) of said polymer is a single peak.

In a second aspect, the invention provides a method for preparing a dispersant, the method comprises: subjecting a monomer mixture to polymerization in water under the solution polymerization conditions in the presence of an initiator, wherein the monomer mixture comprises a monomer A, a monomer B, a monomer C and a monomer D, a monomer A being an unsaturated polyether and/or polyester, a monomer B being an unsaturated carboxylic acid and/or anhydride and/or salt thereof, a monomer C being a silane and/or siloxane containing a polymerizable group, and a monomer D being an unsaturated sulfonic acid and/or a salt thereof; and the molar ratio of monomer A: monomer B: monomer C: monomer D is 1:(0.5-6):(0.01-4):(5-15), preferably 1:(1-4):(0.1-1):(6-10), the polymerization conditions cause that the polymer has a weight average molecular weight of 20,000-120,000.

According to some embodiments of the invention, the conditions of polymerization reaction comprises: a temperature of 50-80° C., preferably 60-70° C., and a time of 2-10 hours, preferably 3-5 hours.

According to some preferred embodiments of the present invention, the monomer mixture is subjected to a pre-oxidation prior to the polymerization reaction, the pre-oxidation is carried out in the presence of hydrogen peroxide (perhydrol). Preferably, the hydrogen peroxide is used in an amount of 0.1-1 g relative to 60 g of the monomer A. The hydrogen peroxide is preferably present in a form of solution having a mass fraction of solute of 20-40 wt %. The pre-oxidation is performed for a time of 5 to 30 minutes.

According to some embodiments of the invention, the initiator is at least one selected from the group consisting of a perhydrol-ascorbic acid (oxidant-reducing agent), a perhydrol-vitamin C, sodium bisulfite, sodium sulfoxylate formaldehyde and sodium dithionite; wherein the oxidant is at least one selected from the group consisting of a perhydrol, a peroxyacetic acid, ammonium persulfate, sodium persulfate and potassium persulfate. Preferably, the perhydrol has a concentration of 25-35 wt %.

Preferably, the initiator is selected from the group consisting of a perhydrol-vitamin C and/or sodium bisulfite.

According to some embodiments of the invention, the polymerization reaction is carried out in the presence of a chain transfer agent.

Preferably, the chain transfer agent is at least one selected from the group consisting of mercaptopropionic acid, mercaptoacetic acid, alkylthiol and isopropanol.

The solvent is preferably used in an amount such that the solid content of the product obtained from the polymerization (the dispersant) is 15-50 wt %.

According to some embodiments of the invention, the method comprises the following steps:

(1) Pre-oxidizing the monomer A at 50-70° C. to obtain a pre-oxidized material;

(2) Subjecting water and monomer B, monomer C, monomer D to a first mixing to obtain a first mixture;

(3) Subjecting water and a chain transfer agent and an initiator to a second mixing to produce a second mixture;

(4) Adding the first mixture and the second mixture into the pre-oxidized material of step (1) to perform a polymerization reaction.

In the present invention, the pre-oxidation in the step (1) is performed in the presence of water, wherein the used amount of water is 50-110 g relative to 60 g of the monomer A.

In the present invention, the pre-oxidation is carried out in the presence of hydrogen peroxide; wherein the hydrogen peroxide is used in an amount of 0.1-1 g relative to 60 g of the monomer A. The hydrogen peroxide is preferably present in a form of solution having a mass fraction of solute of 20-40 wt %. The pre-oxidation is performed for a time of 5-30 minutes.

In the step (2) of the present invention, the water is used in an amount (weight) of 2-3.5 times of the total amount (weight) of the monomer B, monomer C and monomer D.

In step (3), the water is used in an amount (weight) of 50-150 times of the total amount (weight) of chain transfer agent and initiator.

In order to prevent auto-polymerization and implosion in step (4), and ensure that comb-shaped structure is more uniform and well-defined, the first mixture and the second mixture are preferably simultaneously added into the pre-oxidized material of step (1) in a dropwise manner. When a dropwise manner is used, the time of the aforementioned polymerization reaction includes the time of the dropwise addition, i.e., the time of said polymerization reaction is counted from the start of the dropwise addition. Preferably, for the sake of making the polymerization reaction to be more efficient, the reaction and heat preservation are continued for 0.5-1.5 hours after the completion of said dropwise addition.

In the present invention, further post-treatment is not performed after the polymerization reaction, the polymerized material (containing the solvent) can be used directly as a cement slurry dispersant. However, when the relevant structural characterization is performed, the polymer may be subjected to a corresponding purification treatment according to the characterization requirements.

In the present invention, the content of the monomer structures in the polymer and the structural characteristics of the polymer can be tested by using conventional methods in the prior art, for example, characterization is performed through the Infrared Spectroscopy, Nuclear magnetic resonance, Gel Permeation Chromatography, TGA-DSC (Simultaneous Thermal Analyzer) and the like. Specifically, for example, in regard to the Infrared Spectroscopic Analysis, the absorption peak at 3,550 $cm^{-1}$ corresponds to the group —OH of unsaturated acid; the absorption peaks at 3,442 $cm^{-1}$ and 1,110 $cm^{-1}$ correspond to the groups —OH and —C—O—C of unsaturated polyether monomer (e.g., TPEG); the absorption peak at 3,030 $cm^{-1}$ corresponds to the group ═CH on the phenyl ring, each of a plurality of absorption peaks of 1,650 $cm^{-1}$ to 1,450 $cm^{-1}$ and 900 $cm^{-1}$ to 650 $cm^{-1}$ is corresponding to the phenyl ring; the absorption peak at 1,593 $cm^{-1}$ corresponds to the group —COO of unsaturated acid (e.g., acrylic acid); the absorption peaks at 1,461 $cm^{-1}$ and 2,882 $cm^{-1}$ correspond to $CH_2$ in long straight chain of silane and/or siloxane, the absorption peak at 1,347 $cm^{-1}$ corresponds to the group —Si—C—, the absorption peak at 1,100 $cm^{-1}$ corresponds to the group —C—O— or —Si—O—; the absorption peaks at 1,190 $cm^{-1}$, 1,068 $cm^{-1}$, 620 $cm^{-1}$, 530 $cm^{-1}$ correspond to the sulfonic acid group; moreover, the C—C double bond in styrene has a characteristic absorption peak at 1,660 $cm^{-1}$, since the double bond is opened, there is no characteristic absorption peak at this peak; for the same reason, there is no absorption peak between 1,645 $cm^{-1}$ and 1,620 $cm^{-1}$, representing that there is not remaining "—C═C—" of the other olefin.

The molecular weight of the polymer and its distribution are determined by Gel Permeation Chromatography (GPC).

The polymerization products obtained from the aforesaid process can be used directly as cement dispersants without subjecting to the separation and purification step.

In a third aspect, the present invention provides a cement composition comprising the aforementioned dispersant and cement, the dispersant is used in an amount of 0.05-5 wt %, preferably 0.1-1 wt %, based on the total amount of the cement composition.

In the present invention, the content of the dispersant comprises the amount of solvent in the dispersant.

According to some embodiments of the invention, the composition further comprises a filtrate reducer, the filtrate reducer is preferably one or more selected from the group consisting of a cellulose-based filtrate reducer, a polyvinyl alcohol-based filtrate reducer and an AMPS-based filtrate reducer, the filtrate reducer is more preferably selected from an AMPS-based filtrate reducer.

Wherein the filtrate reducer is generally used in an amount of 1-10 wt % of the total amount of the cement composition.

In a fourth aspect, the invention provides an use of the aforesaid polymer, the aforesaid dispersant, the aforesaid cement composition in an oil well cement or oil well construction, the oil well construction is preferably carried out at a temperature range of 20-120° C.

The use of the polymer of the present invention as an oil well cement dispersant solves the strong inhibitive effect of hydration of the conventional dispersants at a temperature range of 20-120° C., and produce the effects of small hydration inhibition and low delayed coagulation by decreasing the content of carboxyl group and increasing the content of sulfonic acid group; in addition, the long chain silanes are coupled and anchored to cement and hydration product through the chemical bonds, such that the adsorption is enhanced, the long chain silanes can be cooperated with the sulfonic acid to effectively control the delayed coagulation of cement without affecting dispersibility; in use, the dispersant can not only solve the fluidity of cement slurry, but also improve the sedimentation stability of the slurry; in addition to good compatibility with additives, the dispersant also exhibit desirable compatibility and dispersibility for additive materials such as micro-silicon and latex; the dispersant is suitable for use in medium- and low-temperature well cementing projects, and greatly meets the actual requirements for oil well cement dispersants.

BRIEF DESCRIPTION OF THE DRAWINGS

The FIGURE illustrates a Gel Permeation Chromatography diagram of the polymer produced in Example 1.

DESCRIPTION OF THE PREFERRED EMBODIMENT

The present invention will be described in detail below with reference to examples, but the invention is not subjected to limitation of the examples.

Unless otherwise specified, the raw materials used in the Examples and Comparative Examples are commercially available, or prepared according to the methods of the prior art.

In the following Examples and Comparative Examples, the amounts of the structural units in the polymer are determined by using the feeding amount of said monomers, in particular, the feeding ratio of individual monomer which actually participates the polymerization is determined by measuring the content of unreacted monomer, thereby determining the contents of said structural units in the polymer; the solid content is obtained through calculation based on the feeding amount, that is, solid content=feeding amount (weight) excluding the solvent/feeding amount (weight) including the solvent*100%. In the Examples, the polymer has a single peak in the DSC spectrogram, indicating that the polymers are random copolymers.

Example 1

101 g of water and 60 g (0.025 mol) of isopentenyl polyoxyethylene ether (TPEG, with a weight average molecular weight of 2,400) were weighted and sufficiently dissolved and uniformly mixed, the mixture was poured into a three-port flask in a constant-temperature water bath, and subjected to a constant speed stirring by a stirring paddle at a rotation speed of 200 rpm and heated to 65° C.; 0.52 g of $H_2O_2$ having a concentration of 30% by mass was weighted and added into the three-port flask. 3.6 g of Acrylic Acid (AA), 36.8 g of p-styrene sulfonic acid, 3 g of vinyl octadecyl trimethoxysilane and 100 g of water were mixed uniformly to form a drip solution A; 0.48 g of mercaptopropionic acid, 0.21 g of vitamin C and 45 g of water were blended uniformly to form a drip solution B. The drip solution A and the drip solution B were dropwise added into the three-port flask in a constant speed by a peristaltic pump, the drip solution A was dropwise added for 3 hours, and the drip solution B was dropwise added for 3.5 hours. After the dropwise adding operation was completed, the temperature was kept for 1 hour. The obtained sample had an actual solid content of 30.0 wt %. Upon the Gel Permeation Chromatography (the FIGURE): the polymer had a weight average molecular weight of 50,280.

Example 2

98 g of water and 60 g (0.025 mol) of isopentenyl polyoxyethylene ether (TPEG, with a weight average molecular weight of 2,400) were weighted and sufficiently dissolved and uniformly mixed, the mixture was poured into a three-port flask in a constant-temperature water bath, and subjected to a constant speed stirring by a stirring paddle at a rotation speed of 200 rpm and heated to 65° C., 0.52 g of $H_2O_2$ having a concentration of 30% by mass was weighted and added into the three-port flask. 7.2 g of Acrylic Acid (AA), 27.6 g of p-styrene sulfonic acid, 5.81 g of 7-octenyl trimethoxysilane and 100 g of water were mixed uniformly to form a drip solution A; 0.48 g of mercaptopropionic acid, 0.21 g of vitamin C and 45 g of water were blended uniformly to form a drip solution B. The drip solution A and the drip solution B were dropwise added into the three-port flask in a constant speed by a peristaltic pump, the drip solution A was dropwise added for 3 hours, and the drip solution B was dropwise added for 3.5 hours. After the dropwise adding operation was completed, the temperature was kept for 1 hour. The obtained sample had an actual solid content of 30.1 wt %. The polymer had a weight average molecular weight of 52,000.

Example 3

103 g of water and 60 g (0.025 mol) of isopentenyl polyoxyethylene ether (TPEG, with a weight average molecular weight of 2,400) were weighted and sufficiently dissolved and uniformly mixed, the mixture was poured into a three-port flask in a constant-temperature water bath, and subjected to a constant speed stirring by a stirring paddle at a rotation speed of 200 rpm and heated to 65° C.; 0.52 g of $H_2O_2$ having a concentration of 30% by mass was weighted and added into the three-port flask. 3.25 g of Itaconic Acid (IA), 46 g of p-styrene sulfonic acid, 3.95 g of vinyl dodecyl trimethoxysilane and 100 g of water were mixed uniformly to form a drip solution A; 0.55 g of mercaptopropionic acid, 0.24 g of vitamin C and 65 g of water were blended uniformly to form a drip solution B. The drip solution A and the drip solution B were dropwise added into the three-port flask in a constant speed by a peristaltic pump, the drip solution A was dropwise added for 3 hours, and the drip solution B was dropwise added for 3.5 hours. After the dropwise adding operation was completed, the temperature was kept for 1 hour. The obtained sample had an actual solid content of 29.9 wt %. The polymer had a weight average molecular weight of 53,890.

Example 4

The polymerization reaction was carried out according to the method of Example 1, except that 36.8 g of p-styrene sulfonic acid was replaced by the same molar amount (i.e., 41.4 g) of 2-Acrylamido-2-methylpropane sulfonic acid (AMPS), the obtained sample had an actual solid content of 29.7 wt %, the polymer had a weight average molecular weight of 54,130.

Example 5

The polymerization reaction was carried out according to the method of Example 1, except that 3 g of vinyl octadecyl trimethoxysilane was replaced by the same molar amount (i.e., 1.86 g) of γ-methacryloxy propyl trimethoxysilane, the obtained sample had an actual solid content of 30.2 wt %, the polymer had a weight average molecular weight of 51,768.

Example 6

The polymerization reaction was carried out according to the method of Example 1, except that 36.8 g of p-styrene sulfonic acid was replaced by the same molar amount of 2-Acrylamido-2-methylpropane sulfonic acid (AMPS), 3 g of vinyl octadecyl trimethoxysilane was replaced by the same molar amount of γ-methacryloxy propyl trimethoxysilane, the obtained sample had an actual solid content of 30.1 wt %, the polymer had a weight average molecular weight of 50,354.

Example 7

The polymerization was carried out according to the method of Example 1, except that the molar ratio of TPEG: Acrylic Acid (AA):sulfonic acid was 1:5:5, the obtained sample had an actual solid content of 29.8 wt %, the polymer had a weight average molecular weight of 50,211.

Example 8

70 g of water and 60 g of HPEG were weighted and sufficiently dissolved and uniformly mixed, the mixture was poured into a three-port flask in a constant-temperature water bath, and subjected to a constant speed stirring by a stirring paddle at a rotation speed of 200 rpm and heated to 65° C., 0.52 g of $H_2O_2$ having a concentration of 30% by mass was weighted and added into the three-port flask. 3.6 g of AA, 31.1 g of AMPS, 0.62 g of KH570 and 100 g of water were mixed uniformly to form a drip solution A; 0.48 g of mercaptopropionic acid, 0.21 g of vitamin C and 45 g of water were blended uniformly to form a drip solution B. The drip solution A and the drip solution B were dropwise added into the three-port flask in a constant speed by a peristaltic pump, the drip solution A was dropwise added for 3 hours, and the drip solution B was dropwise added for 3.5 hours. After the dropwise adding operation was completed, the temperature was kept for 1 hour. The obtained sample had an actual solid content of 30.2 wt %, the polymer had a weight average molecular weight of 51,070.

Example 9

70 g of water and 60 g of TPEG were weighted and sufficiently dissolved and uniformly mixed, the mixture was poured into a three-port flask in a constant-temperature water bath, and subjected to a constant speed stirring by a stirring paddle at a rotation speed of 200 rpm and heated to 65° C., 0.58 g of $H_2O_2$ having a concentration of 30% by mass was weighted and added into the three-port flask. 9.76 g of IA, 31.1 g of AMPS, 1.24 g of KH570 and 100 g of water were mixed uniformly to form a drip solution A; 0.54 g of mercaptopropionic acid, 0.23 g of vitamin C and 60 g of water were blended uniformly to form a drip solution B. The drip solution A and the drip solution B were dropwise added into the three-port flask in a constant speed by a peristaltic pump, the drip solution A was dropwise added for 3.5 hours, and the drip solution B was dropwise added for 4 hours. After the dropwise adding operation was completed, the temperature was kept for 1.5 hours. The obtained sample had an actual solid content of 30.3 wt %, the polymer had a weight average molecular weight of 50,911.

Comparative Example 1

The polymerization reaction was carried out according to the method of Example 1, except that 36.8 g of p-styrene sulfonic acid was replaced by the same molar amount (i.e., 14.4 g) of Acrylic Acid (AA), the obtained sample had an actual solid content of 29.5 wt %, the polymer had a weight average molecular weight of 43,627.

Comparative Example 2

The polymerization reaction was carried out according to the method of Comparative Example 1, except that the vinyl octadecyl trimethoxysilane was not added, the obtained sample had an actual solid content of 29.9 wt %, the polymer had a weight average molecular weight of 51,397.

Comparative Example 3

The polymerization reaction was carried out according to the method of Example 15 in CN108250370A, the obtained sample had an actual solid content of 29.6 wt %, the polymer had a weight average molecular weight of 50,280.

Comparative Example 4

The polymerization reaction was carried out according to the method of Example 1, except that the TPEG, AA and vinyl octadecyl trimethoxysilane were not added, the obtained sample had an actual solid content of 29.1 wt %, the polymer had a weight average molecular weight of 71,583.

Performance Testing:

(1) A cement slurry was prepared according to the National Standard GB/T19139-2003 of China for evaluating its rheological property and thickening time. The cement in use was the class G cement manufactured by the Sichuan Jiahua Cement Plant, and the base slurry I was formulated by mixing 100 parts by weight of cement and 40 parts by weight of water, the mixing amount of the dispersants (the mixture produced from polymerization) in Comparative Examples 1-4 and Examples 1-7 were 0.4% by mass of the cement. The testing results were shown in Table 1.

TABLE 1

| | Flow index n | | Thickening time at 85° C. | Compressive strength at 48 h (MPa) | |
|---|---|---|---|---|---|
| | 25° C. | 85° C. | (min) | 25° C. | 50° C. |
| Base slurry I | 0.42 | 0.34 | 71 | 21.21 | 23.53 |
| Example 1 | 0.91 | 0.85 | 79 | 21.12 | 23.45 |
| Example 2 | 0.86 | 0.80 | 77 | 20.94 | 23.89 |
| Example 3 | 0.87 | 0.82 | 78 | 21.93 | 24.02 |
| Example 4 | 0.83 | 0.77 | 95 | 19.06 | 22.32 |
| Example 5 | 0.84 | 0.76 | 91 | 19.23 | 23.42 |
| Example 6 | 0.70 | 0.66 | 102 | 20.91 | 22.86 |
| Example 7 | 0.82 | 0.75 | 106 | 19.03 | 22.94 |
| Example 8 | 0.67 | 0.59 | 104 | 20.08 | 22.12 |
| Example 9 | 0.69 | 0.60 | 105 | 20.54 | 21.73 |
| Comparative Example 1 | 0.80 | 0.74 | 135 | 18.00 | 21.15 |
| Comparative Example 2 | 0.82 | 0.67 | 99 | 19.42 | 21.78 |
| Comparative Example 3 | 0.75 | 0.68 | 181 | 18.13 | 20.35 |
| Comparative Example 4 | 0.67 | 0.57 | 78 | 20.18 | 22.76 |

As can be seen from Table 1, the dispersant prepared in the present invention had a low delayed coagulation property while ensuring a desired dispersibility in the case of a high used amount of sulfonic acid.

(2) A cement slurry was prepared according to the National Standard GB/T19139-2003 of China for evaluating its rheological property, thickening time and compressive strength. The base slurry II was formulated by mixing 100 parts by weight of cement and 4 parts by weight filtrate reducer and 44 parts by weight of water, the mixing amount of the dispersant was 0.7% by mass of the cement. The filtrate reducer was SCF-180L filtrate reducer produced by the Sinopec Petroleum Engineering Technology Research Institute, the other ingredients were derived from the same sources as those in the formulation I. The testing results were shown in Table 2.

TABLE 2

| | Flow index n | | Thickening time at 85° C. | Compressive strength at 48 h (MPa) | |
|---|---|---|---|---|---|
| | 25° C. | 85° C. | (min) | 25° C. | 50° C. |
| Base slurry II | 0.56 | 0.43 | 131 | 20.40 | 22.77 |
| Example 1 | 0.81 | 0.75 | 136 | 21.57 | 23.98 |
| Example 2 | 0.76 | 0.74 | 135 | 20.22 | 24.56 |
| Example 3 | 0.77 | 0.72 | 132 | 21.98 | 23.02 |
| Example 4 | 0.72 | 0.69 | 145 | 19.06 | 22.32 |
| Example 5 | 0.73 | 0.67 | 141 | 19.23 | 23.42 |
| Example 6 | 0.68 | 0.61 | 147 | 20.91 | 22.86 |
| Example 7 | 0.73 | 0.63 | 159 | 20.03 | 22.94 |
| Example 8 | 0.64 | 0.57 | 152 | 21.57 | 23.98 |
| Example 9 | 0.65 | 0.58 | 155 | 19.23 | 23.42 |
| Comparative Example 1 | 0.73 | 0.65 | 251 | 16.23 | 19.86 |
| Comparative Example 2 | 0.70 | 0.61 | 146 | 17.56 | 20.15 |
| Comparative Example 3 | 0.72 | 0.67 | 269 | 18.56 | 21.11 |
| Comparative Example 4 | 0.62 | 0.54 | 173 | 17.93 | 21.35 |

As can be seen from Table 2, when the dispersants in the present invention were complexed with a filtrate reducer, the dispersants had an obvious dispersion effect, and the thickening time was not significantly influenced, the compressive strength of the set cement was not reduced.

(3) A cement slurry was prepared according to the National Standard GB/T19139-2003 of China for evaluating its rheological property, thickening time and compressive strength. The base slurry III was formulated by mixing 450 g cement, 225 g silicon powder, 225 g weighting material micro manganese powder, 31.5 g filtrate reducer, 27 g nanometer liquid silicon, 27 g latex, 14 g set retarder, 2 g dispersant and 200 g of on-site water, wherein the filtrate reducer was SCF-180L filtrate reducer (AMPS type filtrate reducer) produced by the Sinopec Petroleum Engineering Technology Research Institute, the set retarder was SCR-3 set retarder (acid-type set retarder) produced by the Sinopec Petroleum Engineering Technology Research Institute, the other ingredients were derived from the same sources as those in the formulation I. The testing results were shown in Table 3.

TABLE 3

| | Flow index n | | Thickening time at | Compressive strength at 48 h (MPa) | |
|---|---|---|---|---|---|
| | 25° C. | 85° C. | 85° C. (min) | 25° C. | 50° C. |
| Base slurry III | 0.51 | 0.46 | 251 | 18.34 | 20.73 |
| Example 1 | 0.84 | 0.79 | 257 | 18.50 | 20.65 |
| Example 2 | 0.79 | 0.76 | 259 | 18.53 | 20.57 |
| Example 3 | 0.81 | 0.77 | 251 | 17.98 | 20.20 |
| Example 4 | 0.77 | 0.73 | 256 | 18.01 | 20.36 |
| Example 5 | 0.76 | 0.69 | 272 | 18.52 | 20.24 |
| Example 6 | 0.70 | 0.64 | 258 | 17.99 | 20.68 |
| Example 7 | 0.75 | 0.69 | 277 | 18.03 | 20.34 |
| Example 8 | 0.67 | 0.60 | 260 | 17.96 | 20.18 |
| Example 9 | 0.68 | 0.61 | 263 | 18.11 | 20.20 |
| Comparative Example 1 | 0.65 | 0.54 | 343 | 17.40 | 19.76 |
| Comparative Example 2 | 0.70 | 0.62 | 290 | 17.42 | 20.01 |
| Comparative Example 3 | 0.64 | 0.55 | 351 | 18.49 | 20.31 |
| Comparative Example 4 | 0.66 | 0.59 | 280 | 18.63 | 20.08 |

Formula III was exactly the currently used cement slurry formulation. As can be seen in Table 3, the dispersants of the present invention had desirable compatibility with other additives in the cement slurry, the dispersants had an obvious dispersion effect, and the thickening time was not significantly influenced, the compressive strength of the set cement was not reduced. However, when the dispersants in Comparative Example 1 and Comparative Example 3 were used in combination with the set retarder, the dispersibility of said dispersants was affected, the dispersibility was lower than the dispersants in the present application, and the delayed coagulation time was greatly extended.

Although the invention has been described in detail, the modifications within the inventive concept and scopes will be apparent for those skilled in the art. Moreover, it shall be comprehended that the various aspects described in the invention, the portions of different specific embodiments, and various features enumerated herein may be combined or interchanged in whole or in part. In the various embodiments described above, those embodiments that refer to another specific embodiment can be appropriately combined with other embodiments, as will be understood by those skilled in the art. Furthermore, those skilled in the art will understand that the foregoing description is only used as the typical example, instead of imposing limitation on the present invention.

The invention claimed is:

1. A polymer having a dispersing function, comprising a structural unit a, a structural unit b, a structural unit c, and a structural unit d, wherein the structural unit a is provided by an unsaturated polyether and/or polyester, the structural unit b is provided by an unsaturated carboxylic acid or an anhydride or salt thereof, the structural unit c is provided by a silane that contains a polymerizable group, and the structural unit d is provided by an unsaturated sulfonic acid or a salt thereof;

the molar ratio of the structural unit a to the structural unit d is 1:(5-15);

the polymer has a weight average molecular weight of 20,000-120,000;

the silane is of formula (IV):

formula (IV)

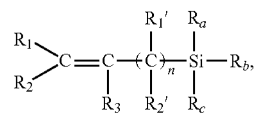

in formula (IV), each of $R_1$, $R_2$, $R_3$, $R_1'$ and $R_2'$ is independently selected from H and $C_1$-$C_4$ alkyl; $R_a$, $R_b$ and $R_c$ are each independently selected from H and $C_1$-$C_4$ alkyl or alkoxyl, and n is an integer from 5 to 25.

2. The polymer of claim 1, wherein the molar ratio of the structural unit a to the structural unit d is 1:(6-10).

3. The polymer of claim 1, wherein the molar ratio of the structural unit a: the structural unit b: the structural unit c is 1:(0.5-6):(0.01-4).

4. The polymer of claim 1, wherein the unsaturated polyester is of formula (I):

formula (I)

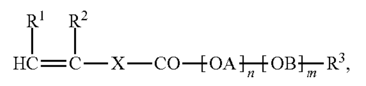

in formula (I),

A denotes an alkylene having 2-4 carbon atoms;

B denotes an alkylene having 2-4 carbon atoms and different from A;

$R^1$ and $R^2$ each independently represents H or an alkyl having 1-5 carbon atoms;

$R^3$ denotes an alkyl having 1-4 carbon atoms;

X denotes an alkylene having 1-5 carbon atoms;

m represents an integer from 0 to 200;

n represents an integer from 0 to 200; and m+n>10; and the unsaturated polyether is of formula (II):

formula (II)

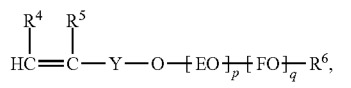

in formula (II),

E denotes an alkylene having 2-4 carbon atoms;

F denotes an alkylene having 2-4 carbon atoms and different from E;

$R^4$ and $R^5$ each independently represents H or an alkyl having 1-5 carbon atoms;

$R^6$ denotes an alkyl having 1-4 carbon atoms;

Y denotes an alkylene having 1-5 carbon atoms;

p represents an integer from 0 to 200;

q represents an integer from 0 to 200; and p+q>10.

5. The polymer of claim 1, wherein the unsaturated carboxylic acid is one or more selected from the group consisting of acrylic acid, methacrylic acid, itaconic acid, fumaric acid, and maleic acid.

6. The polymer of claim 1, wherein the unsaturated sulfonic acid or salt thereof contains a substituted or unsubstituted benzene ring or amide group.

7. The polymer of claim 1, wherein the unsaturated sulfonic acid and/or salt thereof is selected from:

formula IIIA

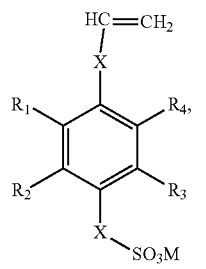

formula IIIB

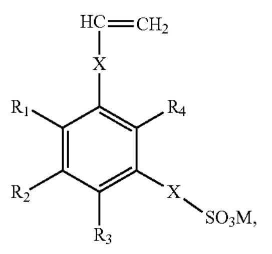

-continued formula IIIC

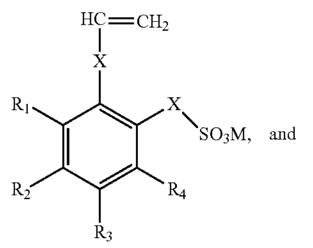

and formula IIID

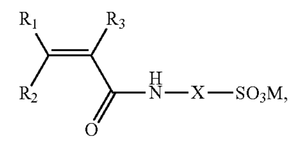

wherein:

in formula IIIA, formula IIIB, and formula IIIC, $R_1$, $R_2$, $R_3$ and $R_4$ are each independently selected from hydrogen, halogen, C1-C6 alkyl, and C1-C6 alkoxyl, X is $(CH_2)_n$, n is an integer from 0to 6, and M is hydrogen or a metal ion, such as an alkali metal ion;

in formula IIID, $R_1$, $R_2$ and $R_3$ are each independently selected from hydrogen and C1-C6 alkyl, X is $(CH_2)_n$, n is an integer from 0 to 6, and M is hydrogen or a metal ion, such as an alkali metal ion;

and/or, the unsaturated sulfonic acid or salt thereof is one or more selected from the group consisting of 2-acrylamide-2-methyl propane sulfonic acid, 2-acrylamido-2-methyl propanesulfonate, p-styrene sulfonic acid, p-styrene sulfonate, methyl p-styrene sulfonic acid, methyl p-styrene sulfonate, allyl sulfonic acid, and allyl sulfonate.

8. The polymer of claim 1, wherein the silane is at least one selected from the group consisting of 7-octenyl trimethoxysilane, vinyl octadecyl trimethoxysilane, vinyl hexadecyl trimethoxysilane, and vinyl dodecyl trimethoxysilane.

9. A method for preparing a polymer, comprising:

subjecting a monomer mixture to polymerization in water under the solution polymerization conditions in the presence of an initiator, wherein the monomer mixture comprises a monomer A, a monomer B, a monomer C and a monomer D, the monomer A being an unsaturated polyether and/or polyester, the monomer B being an unsaturated carboxylic acid and/or anhydride and/or salt thereof, the monomer C being a silane that contains a polymerizable group, and the monomer D being an unsaturated sulfonic acid and/or a salt thereof; and the molar ratio of monomer A: monomer B: monomer C: monomer D is 1:(0.5-6): (0.01-4): (5-15); and controlling the solution polymerization conditions so that the resulting polymer has a weight average molecular weight of 20,000-120,000, wherein the silane is of formula (IV):

(IV)

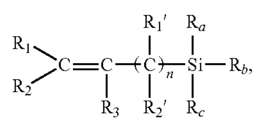

in formula (IV), each of $R_1$, $R_2$, $R_3$, $R_1'$ and $R_2'$ is independently selected from H and C1-C4 alkyl;

$R_a$, $R_b$ and $R_c$ are each independently selected from H and C1-C4 alkyl or alkoxyl, and n is an integer from 5 to 25.

10. The method of claim 9, wherein the unsaturated polyester is of formula (I):

formula (I)

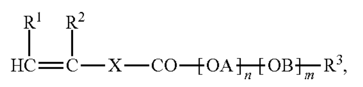

in formula (I),

A denotes an alkylene having 2-4 carbon atoms;

B denotes an alkylene having 2-4 carbon atoms and different from A;

$R^1$ and $R^2$ each independently represents H or an alkyl having 1-5 carbon atoms;

$R^3$ denotes an alkyl having 1-4 carbon atoms;

X denotes an alkylene having 1-5 carbon atoms;

m represents an integer from 0 to 200;

n represents an integer from 0 to 200; and m+n>10; and the unsaturated polyether has a structure represented by formula (II):

formula (II)

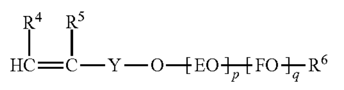

in formula (II),

E denotes an alkylene having 2-4 carbon atoms;

F denotes an alkylene having 2-4 carbon atoms and different from E;

$R^4$ and $R^5$ each independently represents H or an alkyl having 1-5 carbon atoms;

$R^6$ denotes an alkyl having 1-4 carbon atoms;

Y denotes an alkylene having 1-5 carbon atoms;

p represents an integer from 0 to 200;

q represents an integer from 0 to 200; and p+q>10;

and/or, the unsaturated carboxylic acid is one or more selected from the group consisting of acrylic acid, methacrylic acid, itaconic acid, fumaric acid, and maleic acid.

11. The method of claim 9, wherein the unsaturated sulfonic acid or salt thereof contains a substituted or unsubstituted benzene ring or amide group.

12. The method of claim 11, wherein the unsaturated sulfonic acid and/or salt thereof is selected from:

formula IIIA

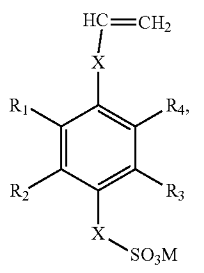

-continued formula IIIB

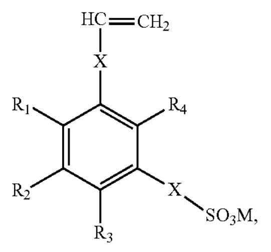

formula IIIC

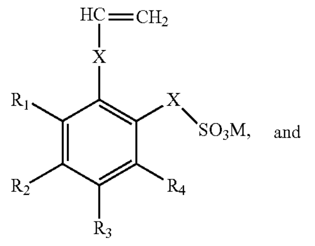

and formula IIID

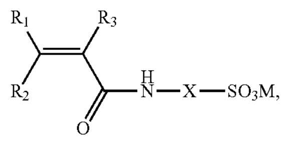

in formula IIIA, formula IIIB, and formula IIIC, $R_1$, $R_2$, $R_3$ and $R_4$ are each independently selected from hydrogen, halogen, C1-C6 alkyl, and C1-C6 alkoxyl, X is $(CH_2)_n$, n is an integer from 0 to 6, and M is hydrogen or a metal ion, such as an alkali metal ion;

in formula IIID, $R_1$, $R_2$ and $R_3$ are each independently selected from hydrogen and C1-C6 alkyl, X is $(CH_2)_n$, n is an integer from 0 to 6, and M is hydrogen or a metal ion, such as an alkali metal ion;

and/or, the unsaturated sulfonic acid or salt thereof is one or more selected from the group consisting of 2-acrylamide-2-methyl propane sulfonic acid, 2-acrylamido-2-methyl propanesulfonate, p-styrene sulfonic acid, p-styrene sulfonate, allyl sulfonic acid, and allyl sulfonate.

13. The method of claim 9, wherein the silane is at least one selected from the group consisting of 7-octenyl trimethoxysilane, vinyl octadecyl trimethoxysilane, vinyl hexadecyl trimethoxysilane, and vinyl dodecyl trimethoxysilane.

14. The method of claim 9, wherein said polymerization reaction is carried out in the presence of a chain transfer agent, at a temperature of 50-80° C. for a duration of 2-10 hours.

15. A cement composition comprising cement and the polymer of claim 1 as a dispersant.

16. The cement composition of claim 15, wherein the dispersant is in an amount of 0.05-5 wt %, based on the total amount of the cement composition.

17. The cement composition of claim 16, wherein the dispersant is in an amount of 0.1-1 wt %, based on the total amount of the cement composition.

18. The cement composition of claim 15, wherein the composition further comprises a filtrate reducer.

* * * * *